(12) United States Patent
Lin et al.

(10) Patent No.: US 7,186,782 B2
(45) Date of Patent: Mar. 6, 2007

(54) HYDROGENATION CATALYST COMPOSITION AND PROCESS FOR HYDROGENATION OF CONJUGATED DIENE POLYMER

(75) Inventors: Fu Lin, Kaohsiung (TW); Jing-Cherng Tsai, Kaohsiung (TW); Chih-Kuang Tsai, Kaohsiung (TW); Shun-An Liu, Kaohsiung (TW)

(73) Assignee: TSRC Corporation, Taipei (TW)

( * ) Notice: Subject to any disclaimer, the term of this patent is extended or adjusted under 35 U.S.C. 154(b) by 36 days.

(21) Appl. No.: 11/086,915

(22) Filed: Mar. 23, 2005

(65) Prior Publication Data

US 2006/0041079 A1  Feb. 23, 2006

(30) Foreign Application Priority Data

Aug. 19, 2004 (TW) ............... 93124937 A

(51) Int. Cl.
*C08C 19/02* (2006.01)
*C08F 8/04* (2006.01)

(52) U.S. Cl. ............... 525/338; 525/332.8; 525/333.2; 525/940; 502/103; 502/117; 502/152

(58) Field of Classification Search ............... 525/338, 525/332.8, 333.2, 940; 502/103, 117, 152
See application file for complete search history.

(56) References Cited

U.S. PATENT DOCUMENTS

| 4,980,421 A | 12/1990 | Teramoto et al. |
| 5,244,980 A | 9/1993 | Gibler et al. |
| 5,270,274 A | 12/1993 | Hashiguchi et al. |
| 5,886,108 A | 3/1999 | Miyamoto et al. |
| 5,948,869 A | 9/1999 | Vallieri et al. |
| 5,985,995 A | 11/1999 | Calle et al. |
| 6,075,103 A * | 6/2000 | Marks et al. ............... 526/127 |
| 6,313,230 B1 * | 11/2001 | Tsai et al. ............... 525/338 |

FOREIGN PATENT DOCUMENTS

| EP | 0 434 469 A2 | 6/1991 |
| EP | 0 544 304 A1 | 6/1993 |

* cited by examiner

*Primary Examiner*—Ling-Sui Choi
(74) *Attorney, Agent, or Firm*—Birch, Stewart, Kolasch, & Stewart, LLP

(57) ABSTRACT

A process for hydrogenation of an unsaturated polymer. The conjugated diene polymer in an inert organic solvent is brought into contact with hydrogen in the presence of a hydrogenation catalyst composition to selectively hydrogenate the unsaturated double bonds in the conjugated diene units of the conjugated diene polymer. The hydrogenation catalyst composition includes: (a) a titanium compound; (b) a compound represented by formula (II) or formula (III):

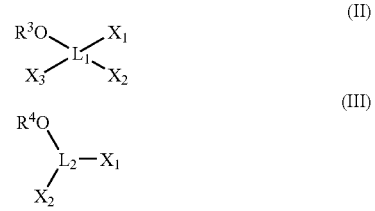

wherein $L_1$ is a Group IVA element, $L_2$ is a Group IVA element, $R^3$ is $C_1$–$C_{12}$ alkyl or $C_1$–$C_{12}$ cycloalkyl, $R^4$ is $C_2$–$C_{12}$ alkyl or $C_3$–$C_{12}$ cycloalkyl, and $X_1$, $X_2$, and $X_3$ can be the same or different and are $C_1$–$C_{12}$ alkyl, $C_1$–$C_{12}$ alkoxy, $C_1$–$C_{12}$ cycloalkoxy, phenyl, or phenoxy; and (c) a trialkylaluminum compound.

28 Claims, 2 Drawing Sheets

HYDROGENATION CATALYST COMPOSITION AND PROCESS FOR HYDROGENATION OF CONJUGATED DIENE POLYMER

BACKGROUND

The present invention relates to a process for hydrogenation of an unsaturated polymer, and more particularly to a process for hydrogenation of an unsaturated polymer using a special catalyst composition.

Generally, polymers obtained by polymerizing or copolymerizing conjugated dienes are widely utilized for commercial purposes. These polymers have residual unsaturated double bonds in their polymer chains. These unsaturated double bonds are advantageously utilized for vulcanization and yet have a disadvantage in that they lack the stability to resist weather conditions, oxidation and ozone due to the presence of a large amount of unsaturated double bonds. Such disadvantage is more severe for block copolymers of conjugated dienes and vinyl aromatic hydrocarbons used as thermoplastic elastomers. Such disadvantage is even more severe when the block copolymers of conjugated dienes and vinyl aromatic hydrocarbons are used as modifiers and transparent impact-resistant materials for styrenic resins and olefinic resins. In the field of exterior materials to which such properties are indispensable, therefore, the block copolymers find limited utility because of this drawback.

This deficiency in stability can be notably improved by hydrogenating such conjugated diene polymers and consequently eliminating the unsaturated double bonds persisting in the polymer chain thereof. Numerous methods have been so far proposed for hydrogenating conjugated diene polymers in the presence of suitable and effective hydrogenation catalysts. Typical hydrogenation catalysts can be classified into two types:

(1) heterogeneous catalysts having compounds of nickel, platinum, or palladium deposited on supports such as active carbon, silica, alumina, or calcium carbonate;

(2) homogeneous catalysts, for example, Ziegler-type catalysts obtained by reacting an organic acid salt of nickel, cobalt, iron, or chromium with a reducing agent such as an organic aluminum compound, and organometallic compounds such as Ru, Rh, Ti, or La compound.

Although widely used in industry, heterogeneous catalysts have lower activity than homogeneous catalysts. Therefore, it requires a large amount of heterogeneous catalyst and the hydrogenation must be conducted at higher temperature and pressure. In contrast, less homogeneous catalyst is needed and the hydrogenation can be conducted at lower temperature and pressure.

Hydrogenation using a heterogeneous catalyst is described as follows. First, the polymer to be hydrogenated is dissolved in a suitable solvent. Then, the polymer is brought into contact with hydrogen in the presence of a heterogeneous catalyst. When the polymer is hydrogenated, contact between the polymer and the catalyst is difficult because of the influence of the viscosity of the reaction system and the influence of stereohindrance of the polymer. Moreover, the hydrogenation requires higher temperature and pressure, and hence, decomposition of the polymer and the gelation of the reaction system tend to occur. Also, in the hydrogenation of a copolymer of a conjugated diene with a vinyl aromatic hydrocarbon, even hydrogenation of the aromatic ring portion takes place due to high temperature and pressure and it has been difficult to selectively hydrogenate only the double bonds in the conjugated diene portion. In addition, since the polymer is strongly adsorbed on the heterogeneous catalyst, it is impossible to completely remove the catalyst from the hydrogenated polymer solution.

On the other hand, with the homogeneous catalyst, the hydrogenation proceeds normally in a homogeneous system. Therefore, compared with the heterogeneous catalyst, the homogeneous catalyst is generally high in activity and a small amount of catalyst enables a satisfactory hydrogenation to be effected at low temperature and low pressure. In addition, when appropriate hydrogenation conditions are selected, it is possible to preferentially hydrogenate the conjugated diene portion of a copolymer of a conjugated diene with a vinyl aromatic hydrocarbon, without hydrogenating the aromatic ring portion.

Conventional processes for hydrogenation of an unsaturated polymer using a homogeneous catalyst are summarized below.

U.S. Pat. No. 4,980,421 discloses a process for hydrogenating a conjugated diene polymer using a hydrogenation catalyst including a bis(cyclopentadienyl)titanium(+4) compound, an alkoxy lithium compound, and an organometallic compound (such as aluminum, zinc, or magnesium compound). This hydrogenation catalyst has high activity and can be used under mild conditions.

U.S. Pat. No. 5,270,274 discloses a hydrogenation catalyst composition including a bis(cyclopentadienyl)titanium (IV) compound, a polarized carbonyl group or epoxy group-containing compound, and an organic lithium compound. The unsaturated double bonds in the conjugated diene polymer can be preferentially hydrogenated. The hydrogenated polymer has superior physical properties and weather resistance.

U.S. Pat. No. 5,244,980 discloses a hydrogenation process including terminating a living conjugated diene polymer with hydrogen, and then adding an organo alkali metal and a Tebbe's catalyst.

U.S. Pat. No. 5,886,108 discloses hydrogenating a living conjugated diene polymer using a Tebbe's catalyst prepared by the reaction of a bis(cyclopentadienyl)titanium(+4) compound and trimethyl aluminum.

U.S. Pat. No. 5,985,995 discloses a process for producing a hydrogenated rubber, which allows an easy and effective deactivation of the living polymer before the hydrogenation step. The deactivation of living polymer is carried out using alkyl silicon halide or alkyl tin halide. The catalyst used in the hydrogenation of the deactivated polymer can be bis (cyclopentadienyl)Ti(PhOCH$_3$)2.

U.S. Pat. No. 5,948,869 discloses a catalyst composition effective in the selective hydrogenation of conjugated diene polymer, which includes a bis(cyclopentadienyl)titanium(+ 4) compound, an alkyl zinc or alkyl magnesium, and a modifier of ethers or aromatic hydrocarbon compounds.

European Patent No. 0434469 A2 discloses a catalyst composition for hydrogenating a conjugated diene polymer, which includes a bis(cyclopentadienyl)titanium compound, an organoaluminum compound or organomagesium compound, and a polar compound of ether or ketone.

European Patent No. 0544304A discloses a catalyst composition including a bis(cyclopentadienyl) transition metal compound, a polarized compound of carbonyl group-containing compound or epoxy group-containing compound, an organic lithium compound, and a reducing organometal compound such as aluminum compound, zinc compound, or magnesium compound, for example, triethyl aluminum.

Although various catalyst compositions have been developed to hydrogenate the conjugated diene polymer, there is still a need to develop a new catalyst composition for hydrogenation of conjugated diene polymers without complex and costly purification.

SUMMARY

Embodiments of the invention provide a stable and easy-to-store catalyst composition including the following hydrogenation catalysts:

(a) a titanium compound represented by formula (I):

wherein $R^1$ and $R^2$ can be the same or different and are hydrogen, halogen, $C_1$–$C_8$ alkyl or alkoxy, $C_6$–$C_{12}$ cycloalkyl, phenyl, phenoxy, $C_7$–$C_{10}$ arylalkoxy and arylalkyl, carboxy, —$CH_2P(phenyl)_2$, —$CH_2Si(C_1$–$C_5$ alkyl$)_3$ or —$P(phenyl)_2$, Cp* indicates cyclopendienyl, indenyl, fluorenyl, or derivatives thereof;

(b) a compound represented by formula (II) or formula (III):

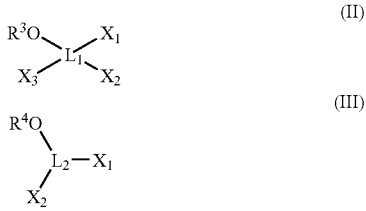

wherein $L_1$ is a Group IVA element,
$L_2$ is a Group IVA element,
$R^3$ is $C_1$–$C_{12}$ alkyl or $C_3$–$C_{12}$ cycloalkyl,
$R^4$ is $C_2$–$C_{12}$ alkyl or $C_3$–$C_{12}$ cycloalkyl,
$X_1$, $X_2$, and $X_3$ can be the same or different and are $C_1$–$C_{12}$ alkyl, $C_1$–$C_{12}$ alkoxy, $C_1$–$C_{12}$ cycloalkoxy, phenyl, or phenoxy; and (c) a trialkylaluminum compound represented by formula (IV):

wherein $R^5$, $R^6$, and $R^7$ can be the same or different and are $C_1$–$C_{12}$ alkyl or $C_6$–$C_{12}$ aryl, provided that $R^5$, $R^6$, and $R^7$ are not methyl simultaneously.

In embodiments of the invention, the molar ratio of the hydrogenation catalyst (b) to the hydrogenation catalyst (a) is 0.1 to 50, and the molar ratio of the hydrogenation catalyst (c) to the hydrogenation catalyst (a) is 0.1 to 50.

Embodiments of the invention further provide a process for hydrogenation of an unsaturated polymer, such as conjugated diene polymers, including the following step. The conjugated diene polymers in an inert organic solvent is brought into contact with hydrogen in the presence of the above hydrogenation catalyst composition to selectively hydrogenate the unsaturated double bonds in the conjugated diene units of the conjugated diene polymer.

The hydrogenation catalyst (a) is present in an amount of 0.0001 to 50 mmol based on 100 g of the conjugated diene polymer. The hydrogenation reaction is conducted at a temperature of 0° C. to 200° C. at a hydrogen pressure of 0.1 kg/cm² to 100 kg/cm².

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the subsequent detailed description and the accompanying drawings, which are given by way of illustration only, and thus are not limitative of the present invention and wherein.

DETAILED DESCRIPTION

Figure 1:
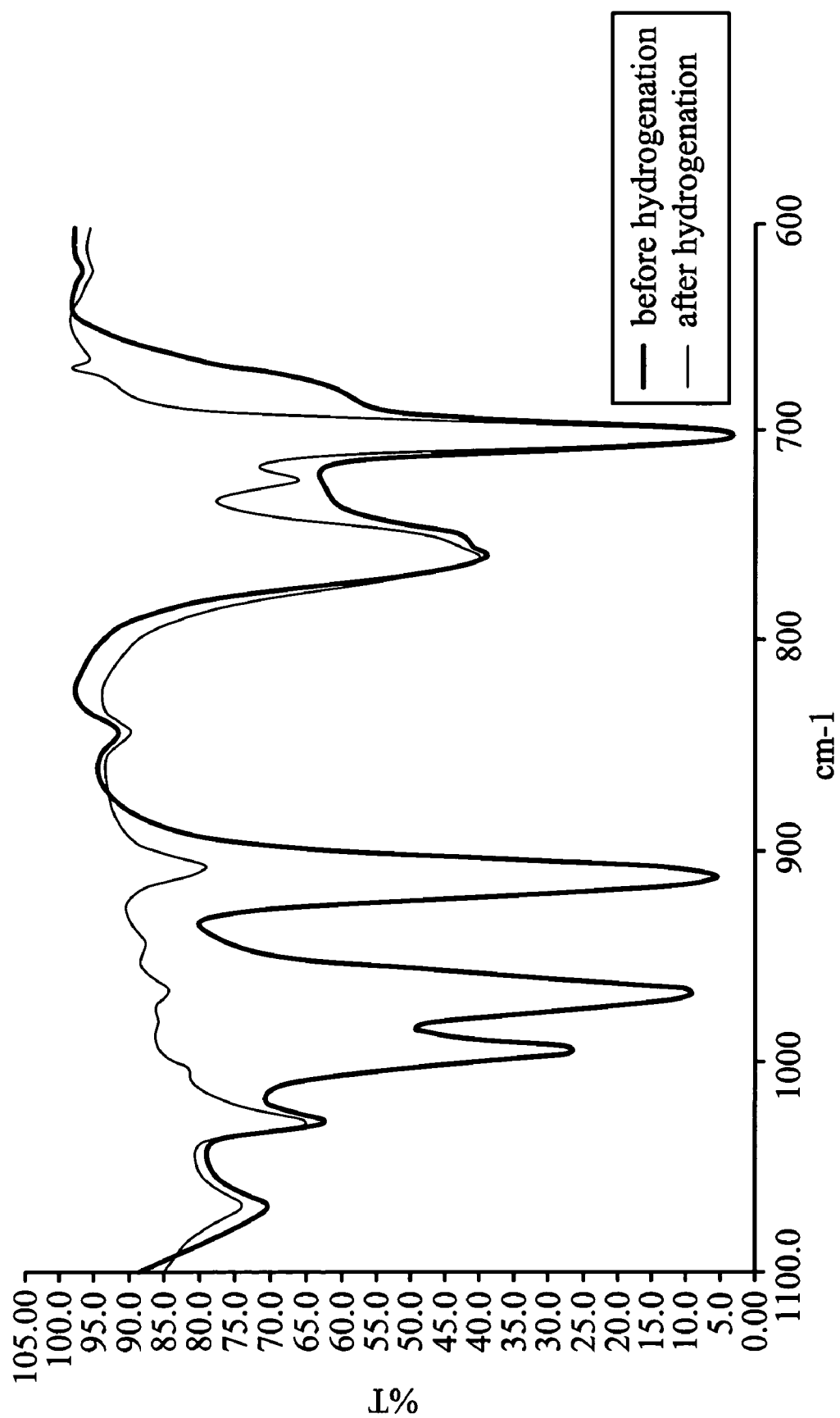
FIG. 1 shows IR spectrum of the SBS copolymer of Example 2 of the present invention before and after hydrogenation.

The hydrogenation catalyst composition according to embodiments of the invention includes hydrogenation catalysts (a), (b), and (c).

The hydrogenation catalyst (a) is a titanium compound represented by formula (I):

wherein $R^1$ and $R^2$ can be the same or different and are hydrogen, halogen, $C_1$–$C_8$ alkyl or alkoxy, $C_6$–$C_{12}$ cycloalkyl, phenyl, phenoxy, $C_7$–$C_{10}$ arylalkoxy and arylalkyl, carboxy, —$CH_2P(phenyl)_2$, —$CH_2Si(C_1$–$C_5$ alkyl$)_3$ or —$P(phenyl)_2$, and Cp* indicates cyclopendienyl, indenyl, fluorenyl, or derivatives thereof.

For example, Cp* can be $C_5(R')_5$, wherein R' can be the same or different and is hydrogen, halogen, alkyl, hydrocarbylaryl, or aryl.

Hydrogenation catalyst (a) suitable for use in the present invention can be bis(cyclopentadienyl)titanium dichloride, bis(1-fluorenyl)titanium dichloride, bis(1-indenyl)titanium dichloride, bis(1-fluorenyl)titanium dibromide, bis(1-indenyl)titanium dibromide, bis(cyclopentadienyl)titanium dimethyl, bis(cyclopentadienyl)titanium diethyl, bis(cyclopentadienyl)titanium dimethanol, bis(indenyl)titanium dimethanol, bis(fluorenyl)titanium dimethanol, bis(cyclopentadienyl)titanium diethoxy, bis(cyclopentadienyl)titanium dibutoxy, bis(cyclopentadienyl)titanium diphenoxy, bis(cyclopentadienyl)titanium dibenzoxy, bis(cyclopentadienyl)titanium dicarboxy, or derivatives thereof. The derivative here indicates that there is a substituent on the indenyl, fluorenyl, or cyclopentadienyl ring, and the substituent can be one or more of methyl, methoxy, p-tert-butylphenyl, pentafluorophenyl, trifluorophenyl, difluorophenyl, or 3,5-(tert-butyl)-4-methoxyphenyl. A preferred example of hydrogenation catalyst (I) is bis(cyclopentadienyl)titanium dichloride.

The hydrogenation catalyst (b) is represented by formula (II) or formula (III):

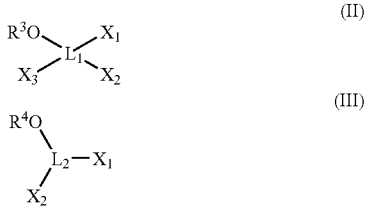

wherein
$L_1$ is a Group IVA element,
$L_2$ is a Group IVA element,
$R^3$ is $C_1$–$C_{12}$ alkyl or $C_3$–$C_{12}$ cycloalkyl,
$R^4$ is $C_2$–$C_{12}$ alkyl or $C_3$–$C_{12}$ cycloalkyl, and
$X_1$, $X_2$, and $X_3$ can be the same or different and are $C_1$–$C_{12}$ alkyl, $C_1$–$C_{12}$ alkoxy, $C_1$–$C_{12}$ cycloalkoxy, phenyl, or phenoxy.

According to a preferred embodiment of the invention, the hydrogenation catalyst (b) is represented by formula (II), and at least one of $X_1$, $X_2$, and $X_3$ is $C_1$–$C_{12}$ alkoxy or $C_1$–$C_{12}$ cycloalkoxy. For example, $X_1$ and $X_2$ are $C_1$–$C_{12}$ alkoxy or $C_1$–$C_{12}$ cycloalkoxy, and $X_3$ is phenyl or alkyl. Such represenatative examples include tri-ethoxy methyl silane, tri-n-propoxy methyl silane, tri-iso-propoxy methyl silane, tri-n-butoxy methyl silane, tri-tert-butoxy methyl silane, tri-n-pentyloxy ethyl silane, tri-tert-pentyloxy ethyl silane, tri-n-propoxy phenyl silane, tri-iso-propoxy phenyl silane, tri-n-butoxy phenyl silane, tri-tert-butoxy phenyl silane, tri-n-pentyloxy phenyl silane, tri-tert-pentyloxy phenyl silane, tri-ethoxy methyl tin, tri-n-propoxy methyl tin, tri-iso-propoxy methyl tin, tri-n-butoxy methyl tin, or tri-tert-butoxy methyl tin.

According to a preferred embodiment of the invention, the hydrogenation catalyst (b) is represented by formula (II), wherein $X_1$, $X_2$, or $X_3$ is $C_1$–$C_{12}$ alkoxy or $C_1$–$C_{12}$ cycloalkoxy and the other two are phenyl. Such represenatative examples include di-n-propoxy dipheny silane, di-n-butoxy diphenyl silane, di-tert-pentyloxy diphenyl silane, di-n-propoxy dipheny tin.

According to a preferred embodiment of the invention, the hydrogenation catalyst (b) is represented by formula (II), and $X_1$, $X_2$, and $X_3$ are the same or different and are $C_1$–$C_{12}$ alkoxy or $C_1$–$C_{12}$ cycloalkoxy. For example, the hydrogenation catalyst (b) is silicon(IV) $C_1$–$C_{12}$ alkoxide or tin(IV) $C_1$–$C_{12}$ alkoxide. Such represenatative examples include silicon(IV) ethoxide, silicon(IV) n-propoxide, silicon(IV) iso-propoxide, silicon(IV) n-butoxide, silicon(IV) sec-butoxide, silicon(IV) tert-butoxide, silicon(IV) n-pentoxide, silicon(IV) tert-pentoxide, silicon(IV) 1-methyl-butoxide, silicon(IV) 2-methyl-butoxide, silicon(IV) 1,2-dimethyl-propoxide, silicon(IV) n-hexoxide, silicon(IV) tert-hexoxide, silicon(IV) 1,1-dimethyl-butoxide, silicon(IV) 2,2-dimethyl-butoxide, silicon(IV) 3,3-dimethyl-butoxide, silicon(IV) hendecoxide, silicon(IV) dodecoxide, tin(IV) ethoxide, tin(IV) n-propoxide, tin(IV) sec-propoxide, tin(IV) n-butoxide, tin(IV) sec-buyoxide, tin(IV) tert-butoxide, or tin(IV) n-pentyloxide.

According to a preferred embodiment of the invention, the hydrogenation catalyst (b) is represented by formula (III), and at least one of $X_1$, and $X_2$ is $C_1$–$C_{12}$ alkoxy or $C_1$–$C_{12}$ cycloalkoxy. For example, the hydrogenation catalyst (b) is aluminum(III) $C_1$–$C_{12}$ alkoxy or gallium $C_1$–$C_{12}$ alkoxy. Such represenatative examples include aluminum triethoxide, aluminum(III) n-propoxide, aluminum(III) tert-propoxide, aluminum(III) n-butoxide, aluminum(III) sec-butoxide, aluminum(III) tert-butoxide, gallium(III) ethoxide, gallium(III) n-propoxide, gallium(III) tert-propoxide, gallium(III) n-butoxide, gallium(III) sec-butoxide, or gallium(III) tert-butoxide.

When the hydrogenation catalyst (b) is represented by formula (II), in addition to the above-mentioned silicon and tin compounds, representative examples of the hydrogenation catalyst (b) further include silicon(IV) 1-methylpentoxide, silicon(IV) 2-methylpentoxide, silicon(IV) 3-methylpentoxide, silicon(IV) 1,2-dimethylbutoxide, silicon(IV) 1,3-dimethylbutoxide, silicon(IV) 1-ethylbutoxide, silicon(IV) 2-ethylbutoxide, silicon(IV) cyclohexoxide, silicon(IV) n-heptoxide, silicon(IV) isoheptoxide, silicon(IV) 4-methylhexoxide, silicon(IV) 3-methylhexoxide, silicon(IV) 2-methylhexoxide, silicon(IV) 1-methylhexoxide, silicon(IV) 1,1-dimethylpentoxide, silicon(IV) 2,2-dimethylpentoxide, silicon(IV) 3,3-dimethylpentoxide, silicon(IV) 4,4-dimethylpentoxide, silicon(IV) 1,2-dimethylpentoxide, silicon(IV) 1,3-dimethylpentoxide, silicon(IV) 1,4-dimethylpentoxide, silicon(IV) 1-ethylpentoxide, silicon(IV) 1-propylpentoxide, silicon(IV) 2-ethylpentoxide, silicon(IV) 3-ethylpentoxide, silicon(IV) 1,1-ethylmethylbutoxide, silicon(IV) 1,1-diethylpropoxide, silicon(IV) 2,3-dimethylpentoxide, silicon(IV) 2,4-dimethylpentoxide, silicon(IV) 3,4-dimethylpentoxide, silicon(IV) 1-ethyl-3-methylbutoxide, silicon(IV) 4-methylcyclohexoxide, silicon(IV) 3-methylbutoxide, silicon(IV) 3-methylcyclohexoxide, silicon(IV) cycloheptoxide, silicon(IV) 1,1,2-trimethylbutoxide, silicon(IV) 1,1,3-trimethylbutoxide, silicon(IV) 2,2,1-trimethylbutoxide, silicon(IV) 2,2,3-trimethylbutoxide, silicon(IV) 3,3,1-trimethylbutoxide, silicon(IV) 3,3,2-trimethylbutoxide, silicon(IV) 1,1,2,2-tetramethylpropoxide, silicon(IV) n-octoxide, silicon(IV) 1-methylheptoxide, silicon(IV) 2-methylheptoxide, silicon(IV) 3-methylheptoxide, silicon(IV) 4-methylheptoxide, silicon(IV) 5-methylheptoxide, silicon(IV) isooctoxide, silicon(IV) 1-ethylhexoxide, silicon(IV) 2-ethylhexoxide, silicon(IV) 3-ethylhexoxide, silicon(IV) 4-ethylhexoxide, silicon(IV) 1,1-dimethylhexoxide, silicon(IV) 2,2-dimethylhexoxide, silicon(IV) 3,3-dimethylhexoxide, silicon(IV) 4,4-dimethylhexoxide, silicon(IV) 5,5-dimethylhexoxide, silicon(IV) 1,2-dimethylhexoxide, silicon(IV) 1,3-dimethylhexoxide, silicon(IV) 1,4-dimethylhexoxide, silicon(IV) 1,5-dimethylhexoxide, silicon(IV) 2,3-dimethylhexoxide, silicon(IV) 2,4-dimethylhexoxide, silicon(IV) 3,4-dimethylhexoxide, silicon(IV) 2,5-dimethylhexoxide, silicon(IV) 3,5-dimethylhexoxide, silicon(IV) 1,1-methylethylpentoxide, silicon(IV) 1-ethyl-2-methylpentoxide, silicon(IV) 1-ethyl-3-methyl-pentoxide, silicon(IV)

1-ethyl-4-methylpentoxide, silicon(IV) 2-ethyl-1-methylpentoxide, silicon(IV) 2,2-ethylmethylpentoxide, silicon(IV) 3,3-ethylmethylpentoxide, silicon(IV) 2-ethyl-3-methylpentoxide, silicon(IV) 2-ethyl-4-methylpentoxide, silicon(IV) 3-ethyl-4-methylpentoxide, silicon(IV) 3-ethyl-2-methylpentoxide, silicon(IV) 1,1-diethylbutoxide, silicon(IV) 2,2-diethylbutoxide, silicon(IV) 1,2-diethylbutoxide, silicon(IV) 1,1-methylpropylbutoxide, silicon(IV) 2-methyl-1-propylbutoxide, silicon(IV) 3-methyl-1-propylbutoxide, silicon(IV) 4-ethylcyclohexoxide, silicon(IV) 3-ethylcyclohexoxide, silicon(IV) 3,4-dimethylcyclohexoxide, silicon(IV) 1,1,2-trimethylpentoxide, silicon(IV) 1,1,3-trimethylpentoxide, silicon(IV) 1,1,4-trimethylpentoxide, silicon(IV) 2,2,1-trimethylpentoxide, silicon(IV) 2,2,3-trimethylpentoxide, silicon(IV) 2,2,4-trimethylpentoxide, silicon(IV) 3,3,1-trimethylpentoxide, silicon(IV) 3,3,2-trimethylpentoxide, silicon(IV) 3,3,4-trimethylpentoxide, silicon(IV) 1,2,3-trimethylpentoxide, silicon(IV) 1,2,4-trimethylpentoxide, silicon(IV) 1,3,4-trimethylpentoxide, silicon(IV) 1,2,3-trimethylpentoxide, silicon(IV) 1,2,4-trimethylpentoxide, silicon(IV) 1,3,4-trimethylpentoxide, silicon(IV) 1,1,2,2-tetramethylbutoxide, silicon(IV) 1,1,3,3-tetramethylbutoxide, silicon(IV) 1,1,2,3-tetramethylbutoxide, silicon(IV) 2,2,1,3-tetramethylbutoxide, silicon(IV) 1-ethyl-1,2-dimethylbutoxide, silicon(IV) 1-ethyl-2,3-dimethylbutoxide, silicon(IV) n-nonoxide, silicon(IV) isononoxide, silicon(IV) 1-methyloctoxide, silicon(IV) 2-methyloctoxide, silicon(IV) 3-methyloctoxide, silicon(IV) 4-methyloctoxide, silicon(IV) 5-methyloctoxide, silicon(IV) 6-methyloctoxide, silicon(IV) 1-ethylheptoxide, silicon(IV) 2-ethylheptoxide, silicon(IV) 3-ethylheptoxide, silicon(IV) 4-ethylheptoxide, silicon(IV) 5-ethylheptoxide, silicon(IV) 1,1-dimethylheptoxide, silicon(IV) 2,2-dimethylheptoxide, silicon(IV) 3,3-dimethylheptoxide, silicon(IV) 4,4-dimethylheptoxide, silicon(IV) 5,5-dimethylheptoxide, silicon(IV) 6,6-dimethylhexoxide, silicon(IV) 1,2-dimethylheptoxide, silicon(IV) 1,3-dimethylheptoxide, silicon(IV) 1,4-dimethylheptoxide, silicon(IV) 1,5-dimethylheptoxide, silicon(IV) 1,6-dimethylheptoxide, silicon(IV) 2,3-dimethylheptoxide, silicon(IV) 2,4-dimethylheptoxide, silicon(IV) 2,5-dimethylheptoxide, silicon(IV) 2,6-dimethylheptoxide, silicon(IV) 3,4-dimethylheptoxide, silicon(IV) 3,5-dimethylheptoxide, silicon(IV) 3,6-dimethylheptoxide, silicon(IV) 4,5-dimethylheptoxide, silicon(IV) 4,6-dimethylheptoxide, silicon(IV) 5,6-dimethylheptoxide, silicon(IV) 1,1,2-trimethylhexoxide, silicon(IV) 1,1,3-trimethylhexoxide, silicon(IV) 1,1,4-trimethylhexoxide, silicon(IV) 1,1,5-trimethylhexoxide, silicon(IV) 2,2,1-trimethylhexoxide, silicon(IV) 2,2,3-trimethylhexoxide, silicon(IV) 2,2,4-trimethylhexoxide, silicon(IV) 2,2,5-trimethylhexoxide, silicon(IV) 3,3,1-trimethylhexoxide, silicon(IV) 4,4,1-trimethylhexoxide, silicon(IV) 4,4,2-trimethylhexoxide, silicon(IV) 4,4,3-trimethylhexoxide, silicon(IV) 4,4,5-trimethylhexoxide, silicon(IV) 2,3,4-trimethylhexoxide, silicon(IV) 3,4,5-trimethylhexoxide, silicon(IV) 1,3,4-trimethylhexoxide, silicon(IV) 1,4,5-trimethylhexoxide, silicon(IV) 2,4,5-trimethylhexoxide, silicon(IV) 1,2,5-trimethylhexoxide, silicon(IV) 1,2,4-trimethylhexoxide, silicon(IV) n-decoxide, silicon(IV) isodecoxide, silicon(IV) 1-methylnonoxide, silicon(IV) 2-methylnonoxide, silicon(IV) 3-methylnonoxide, silicon(IV) 4-methylnonoxide, silicon(IV) 5-methylnonoxide, silicon(IV) 6-methylnonoxide, silicon(IV) 7-methylnonoxide, silicon(IV) 1-ethyloctoxide, silicon(IV) 2-ethyloctoxide, silicon(IV) 3-ethyloctoxide, silicon(IV) 4-ethyloctoxide, silicon(IV) 5-ethyloctoxide, silicon(IV) 6-ethyloctoxide, silicon(IV) 1,1-dimethyloctoxide, silicon(IV) 2,2-dimethyloctoxide, silicon(IV) 3,3-dimethyloctoxide, silicon(IV) 4,4-dimethyloctoxide, silicon(IV) 5,5-dimethyloctoxide, silicon(IV) 6,6-dimethyloctoxide, silicon(IV) 7,7-dimethyloctoxide, silicon(IV) 1,2-dimethyloctoxide, silicon(IV) 1,3-dimethyloctoxide, silicon(IV) 1,4-dimethyloctoxide, silicon(IV) 1,5-dimethyloctoxide, silicon(IV) 1,6-dimethyloctoxide, silicon(IV) 1,7-dimethyloctoxide, silicon(IV) 2,3-dimethyloctoxide, silicon(IV) 2,4-dimethyloctoxide, silicon(IV) 2,5-dimethyloctoxide, silicon(IV) 2,6-dimethyloctoxide, silicon(IV) 2,7-dimethyloctoxide, silicon(IV) 3,4-dimethyloctoxide, silicon(IV) 3,5-dimethyloctoxide, silicon(IV) 3,6-dimethyloctoxide, silicon(IV) 3,7-dimethyloctoxide, silicon(IV) 4,5-dimethyloctoxide, silicon(IV) 4,6-dimethyloctoxide, silicon(IV) 4,7-dimethyloctoxide, silicon(IV) 5,6-dimethyloctoxide, silicon(IV) 5,7-dimethyloctoxide, chlorosilicon tri-n-hexoxide, chlorosilicon triisohexoxide, chlorosilicon triisopropoxide, chlorotitanium tri-n-butoxide, chlorosilicon triisobutoxide, chlorosilicon tri(1-methylbutoxide), chlorosilicon tri-n-pentoxide, chlorosilicon triisopentoxide, chlorosilicon tri(2-methylbutoxide), chlorosilicon tri(1,2-dimethylpropoxide), chlorosilicon tri-neo-pentoxide, chlorosilicon tri-n-hexoxide, chlorosilicon triisohexoxide, chlorosilicon tri(1,1-dimethylbutoxide), chlorosilicon tri(2,2-dimethylbutoxide), chlorosilicon tri(3,3-dimethylbutoxide), chlorosilicon tri(1-ethylbutoxide), chlorosilicon tri(2-ethylbutoxide), chlorosilicon tricyclohexoxide, chlorosilicon tri-n-heptoxide, chlorosilicon triisoheptoxide, chlorosilicon tri(1,1-dimethylpentoxide), chlorosilicon tri(2,2-dimethylpentoxide), chlorosilicon tri(3,3-dimethylpentoxide), chlorosilicon tri(4,4-dimethylpentoxide), tin(IV) 1-methyl-pentoxide, tin(IV) 2-methyl-pentoxide, tin(IV) 3-methyl-pentoxide, tin(IV) 1,2-dimethyl-butoxide, tin(IV) 1,3-dimethyl-butoxide, tin(IV) 1-ethylbutoxide, tin(IV) 2-ethylbutoxide, tin(IV) cyclohexoxide, tin(IV) n-heptoxide, tin(IV) isoheptoxide, tin(IV) 4-methylhexoxide, tin(IV) 3-methylhexoxide, tin(IV) 2-methylhexoxide, tin(IV) 1-methylhexoxide, tin(IV) 1,1-dimethylpentoxide, or tin(IV) 2,2-dimethylpentoxide.

When the hydrogenation catalyst (b) is represented by formula (III), in addition to the above-mentioned aluminum and gallium compounds, representative examples of the hydrogenation catalyst (b) further include aluminum(III) n-ethoxide, aluminum(III) n-propoxide, aluminum(III) n-pentoxide, aluminum(III) isopentoxide, aluminum(III) 1-methylbutoxide, aluminum(III) 2-methylbutoxide, aluminum(III) 1,2-dimethylpropoxide, aluminum(III) neopentoxide, aluminum(III) n-hexoxide, aluminum(III) isohexoxide, aluminum(III) 1-methylpentoxide, aluminum(III) 2-methylpentoxide, aluminum(III) 3-methylpentoxide, aluminum(III) 1,1-dimethylbutoxide, aluminum(III) 2,2-dimethylbutoxide, aluminum(III) 3,3-dimethylbutoxide, aluminum(III) 1,2-dimethylbutoxide, aluminum(III) 1,3-dimethylbutoxide, aluminum(III) 1-ethylbutoxide, aluminum(III) 2-ethylbutoxide, aluminum(III) cyclohexoxide, aluminum(III) isopropoxide, aluminum(III) n-butoxide, aluminum(III) sec-butoxide, aluminum(III) isobutoxide, aluminum(III) n-pentoxide, aluminum(III) isopentoxide, and aluminum(III) 1-methylbutoxide, gallium(III) n-ethoxide, gallium(III) n-propoxide, gallium(III) n-pentoxide, gallium(III) isopentoxide, gallium(III) 1-methylbutoxide, gallium(III) 2-methylbutoxide, gallium(III) 1,2-dimethylpropoxide, or gallium(III) neopentoxide.

The hydrogenation catalyst (c) is a trialkylaluminum compound represented by formula (IV):

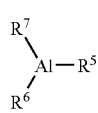

(IV)

wherein $R^5$, $R^6$, and $R^7$ can be the same or different and are $C_1$–$C_{12}$ alkyl or $C_6$–$C_{12}$ aryl, provided that $R^5$, $R^6$, and $R^7$ are not methyl simultaneously.

Representative examples of the hydrogenation catalyst (c) include triethyl aluminum, tri-n-propyl aluminum, triisopropyl aluminum, tributyl aluminum, tri-sec-butyl aluminum, triisobutyl aluminum, tri-n-pentyl aluminum, triisopentyl aluminum, tri-n-hexyl aluminum, triisohexyl aluminum, tri(1-methylpentyl) aluminum, tri(2,5-dimethyloctyl) aluminum, tri(2,6-dimethyloctyl) aluminum, or triphenyl aluminum. Preferred selections include triethyl aluminum, triisopropyl aluminuim, tributyl aluminuim, or triisobutyl aluminum, most preferably triisobutyl aluminum.

The hydrogenation of the present invention involves bringing the conjugated diene polymer in an inert organic solvent into contact with hydrogen in the presence of a hydrogenation catalyst composition of the present invention. Thus, the unsaturated double bonds in the conjugated diene units of the conjugated diene polymer are selectively hydrogenated. The hydrogenation catalyst composition of the present invention includes hydrogenation catalysts (I), (II), and (III) as mentioned above. Specifically, for example, gaseous hydrogen is introduced into the conjugated diene polymer. Then, stirring is conducted to completely contact the hydrogen and conjugated diene polymer. Hydrogenation can be conducted by batch or continuous methods.

The addition of the hydrogenation catalysts (a), (b), and (c) is not limited by technique. For example, catalyst (II) can be first added to the polymer solution, and then a mixed solution of catalysts (I) and (III) is added. Alternatively, catalyst (II) can be first added to the polymer solution, followed by a catalyst (I) solution and a catalyst (III) solution, respectively. After all the catalysts are added to the polymer, the polymer is kept in inert gas atmosphere. The catalyst composition still has relatively good activity even after long storage. Therefore, the catalyst composition of the present invention is very suitable for industrial mass production.

According to the present invention, the inert organic solvent dissolving the hydrogenation catalysts and the conjugated diene polymer can be a linear or branched hydrocarbon compound such as pentane, hexane, heptane, octane, and the like; or a cyclic hydrocarbon compound such as cyclohexane, cycloheptane, and methylheptane. Cyclohexane is the most suitable example. Alternatively, the inert organic solvent can be aromatic hydrocarbon such as benzene, toluene, xylene, and ethylbenzene, but is limited to those in which the aromatic double bonds are not hydrogenated under the hydrogenation condition used in the present invention.

Preparation of catalysts (a), (b), and (c) are conducted in inert gas and low water content. The inert gas refers to helium, neon, nitrogen, and the like, which will not participate in hydrogenation. Air, oxygen, or high water content atmosphere will oxidize or decompose the hydrogenation catalysts, causing reduced activity in catalysts. When the catalyst is pre-mixed, the temperature is preferably room temperature and the mixing time not too long. Also, after the catalyst is prepared, preferably, it is immediately added to the polymer solution to prevent side reactions.

According to the present invention, conjugated diene polymers are produced by any of the methods known in the art, such as, for example, anionic polymerization, cationic polymerization, free radical polymerization, complex polymerization, solution polymerization, and emulsion polymerization. The conjugated diene polymer can have a number average molecular weight of 1000 to 1000000. It is preferable to use an organic lithium compound to serve as a catalyst initiator, thus obtaining a living polymer. The living polymer contains a lithium atom at the terminal end of the molecule chain. Therefore, when the monomer is added, polymerization can further proceed to lengthen the molecule chain. Examples of such organic lithium compounds are monolithium compounds such as n-propyl lithium, isopropyl lithium, tert-butyl lithium, n-pentyl lithium, phenyl lithium, or tolyl lithium, and dilithium compounds such as 1,4-dilithio-n-butane, 1,5-dilithio-pentane, 1,2-dilithio-diphenyl ethane, 1,4-dilithio-1,1,4,4-tetraphenyl butane, 1,3- or 1,4-bis(1-litho-3-methylpentyl)-benzene. The amount of such organic lithium compound may be suitably selected depending on the desired molecular weight of the polymer. Generally, this amount is in the range of 0.05 to 5 wt % based on the total weight of all monomers used.

The term "conjugated diene polymer" as used in the present invention describes both a homopolymer and a copolymer of a conjugated diene. The copolymer of a conjugated diene can be random, block and graft copolymers of two or more conjugated dienes, or random, block and graft copolymers of at least one conjugated diene monomer and at least one vinyl aromatic hydrocarbon.

Conjugated diene monomer suitable for use in the present invention can be a conjugated diene having carbon atoms from 4 to 12. Representative examples include 1,3-butadiene, isoprene, 2,3-dimethyl-1,3-butadiene, 1,3-pentadiene, 2-methyl-1,3-pentadiene, 1,3-hexadiene, 4,5-diethyl-1,3-octadiene and 3-butyl-1,3-octadiene.

When the conjugated diene/vinyl aromatic hydrocarbon copolymer is hydrogenated, a high value thermoplastic elastomer is obtained. Aromatic hydrocarbon monomers suitable for use in the present invention include styrene, tert-butylstyrene, δ-methyl styrene, o-methyl styrene, p-methyl styrene, divinyl benzene, 1,1-diphenyl ethylene, vinyl naphthalene, N,N-dimethyl-p-aminoethylstyrene, and N,N-diethyl-p-aminoethylstyrene, preferably styrene. Representative examples of conjugated diene/vinyl aromatic hydrocarbon copolymer include butadiene/styrene copolymer and isoprene/styrene copolymer, since these copolymers, after hydrogenation, have high industrial value.

In addition, a tertiary amine compound or ether compound can be added to the conjugated diene polymer system to increase the vinyl structure content of the conjugated diene. Compounds suitable for use include general tertiary amine compounds and tetrahydrofuran.

0.0001 to 50 mmol of the hydrogenation catalyst (a) based on 100 g of the conjugated diene polymer is sufficient. If more than 50 mmol is used, the hydrogenation result does not improve, loses economical efficiency, and the catalyst removal procedures are more complicated. Preferably, the hydrogenation catalyst (a) is present in an amount of 0.002 to 1 mmole, most preferably 0.005 to 0.2 mmol based on 100 g of the conjugated diene polymer.

Preferably, the molar ratio of the hydrogenation catalyst (b) to the hydrogenation catalyst (a) is 0.1 to 50. If the molar ratio is less than 0.1, the hydrogenation catalyst cannot efficiently increase the hydrogenation activity, thus, hydrogenation stops and the ideal goal cannot be achieved. If the molar ratio is higher than 50, the catalyst must be removed and unnecessary secondary reaction easily occurs, which hinders the hydrogenation. Most preferably, the molar ratio of the hydrogenation catalyst (b) to the hydrogenation catalyst (a) is 2 to 15.

Preferably, the molar ratio of the hydrogenation catalyst (c) to the hydrogenation catalyst (a) is 0.1 to 50. If the molar ratio is less than 0.1, the catalyst (c) cannot activate the catalyst (a) and the hydrogenation conversion is poor. If the molar ratio is higher than 50, the hydrogenation rate can be enhanced at the initial stage, but at the middle stage, unnecessary secondary products will rapidly decrease the hydrogenation conversion. Also, the catalyst must be removed, which makes the subsequent procedures more complicated. Preferably, the molar ratio of the hydrogenation catalyst (c) to the hydrogenation catalyst (a) is 2 to 15, most preferably 6 to 10.

The hydrogenation reaction of the present invention can be conducted at a temperature of 0° C. to 200° C. If the reaction temperature is lower than 0° C., the reaction rate is too low and the catalyst (a) amount must be increased, impacting economical efficiency. If the reaction temperature is higher than 200° C., the catalyst will be deactivated, thus decreasing the catalytic activity. Also, secondary reaction easily occurs, which in turn decomposes the polymer to form gel. Preferably, the hydrogenation temperature is 40° C. to 140° C.

The hydrogenation can be conducted at a hydrogen pressure of 0.1 kg/cm$^2$ to 100 kg/cm$^2$, preferably 1 to 90 kg/cm$^2$, more preferably 1 to 50 kg/cm$^2$, and most preferably 2 to 35 kg/cm$^2$. When the hydrogen pressure is less than 1 kg/cm$^2$, the reaction rate may be not obvious. When the hydrogen pressure is higher than 90 kg/cm$^2$, the hydrogenation will rapidly stop. The catalyst amount can be decreased by increasing the hydrogen pressure. In order to decrease the catalyst amount, it is preferable to conduct hydrogenation at higher hydrogen pressure.

According to the present invention, the hydrogenation time can be several seconds to 40 hours. Suitable range can be adjusted by the reaction conditions such as the ratio of the catalysts, hydrogen pressure, and hydrogenation temperature.

According to the present invention, the catalyst composition amount, hydrogen pressure, and hydrogenation temperature can be adjusted to achieve the desired hydrogenation conversion of double bonds in the conjugated diene polymer. Using the catalyst composition of the present invention to hydrogenate the conjugated diene/vinyl aromatic hydrocarbon copolymer, at least 50%, even at least 90%, even at least 95%, and even at least 97%, of the unsaturated double bonds in the conjugated diene units are hydrogenated. In contrast, lower than 10%, and even lower than 3%, of the aromatic ring (such as benzene ring) double bonds in the vinyl aromatic hydrocarbon units are hydrogenated. That is to say, the catalyst composition of the present invention has relatively good catalytic selectivity. The hydrogenation conversion for the conjugated diene units can be detected by IR spectrum analysis, and the hydrogenation conversion for the aromatic ring double bonds in the vinyl aromatic hydrocarbon units can be detected by UV spectrum analysis, which can be referred to U.S. Pat. No. 4,501,857.

The polymer solution obtained from hydrogenation using the hydrogenation catalyst composition of the present invention can be coagulated by adding a polar solvent. Such polar solvent is a poor solvent for the hydrogenated polymer, such as methanol or acetone. Or, alternatively, the hydrogenated polymer solution can be poured into hot water, stirred, and distilled for separation. The hydrogenated polymer solution can also be directly heated to evaporate the solvent for separation.

According to the present invention, the conjugated diene polymer can be successfully hydrogenated using a small amount of a hydrogenation catalyst composition with relatively high activity. Since the catalyst composition concentration is very low, most catalyst is separated from the polymer or decomposes during the polymer separation procedure. Therefore, there is no need to wash or remove the catalyst from the hydrogenated polymer, greatly enhancing economic efficiency.

A feature of the catalyst composition of the present invention is catalyst (b), which combines with other catalysts to stabilize other catalysts and enhance the catalytic activity thereof. Therefore, when the catalyst composition of the present invention is added to the conjugated diene polymer, it can be stored for 4 to 5 days in inert gas atmosphere, still maintaining good catalytic activity and reproducibility. Another feature is that the catalyst composition of the present invention has high hydrogenation activity over a wide range of temperatures and pressures. In addition, the catalyst composition of the present invention is resistant to high temperature and will not lose catalytic activity due to high hydrogenation reaction heat. Therefore, it is very suitable for continuous production.

The following examples are intended to demonstrate this invention more fully without limiting its scope, since numerous modifications and variations will be apparent to those skilled in the art.

EXAMPLE 1

Preparation of SBS Copolymer 5400 g of cyclohexane, 7.4 mmol of n-butyl lithium, and 252 mmol of tetrahydrofuran (THF) were charged in 10 L of a heater equipped with a stirrer. Then, 96 g of styrene was added and the polymerization was conducted at 45° C. Then, 400 g of 1,3-butadiene and 96 g of styrene were added to the reaction system and the reaction mixture was further polymerized to an SBS (styrene-butadiene-styrene) tri-block copolymer (solid content=9.7%, Mw=230,000).

EXAMPLE 2

1000 g of the polymer solution of SBS tri-block copolymer prepared from Example 1 was transferred to a pressure-resistant hydrogenation vessel and maintained in nitrogen atmosphere. 0.11 mmol of silicon(IV) isopropoxide was dissolved in 10 ml of cyclohexane at room temperature, 0.11 mmol of titanium(IV) isopropoxide and 0.16 mmol of n-butyl lithium were mixed in 10 ml of cyclohexane in a glove box, and 0.055 mmol of bis(cyclopentadienyl)titanium dichloride and 0.33 mmol of triisobutyl aluminum were mixed in 20 ml of cyclohexane. The above solutions were added to the SBS copolymer. Hydrogen was fed under a pressure of 25 kg/cm$^2$ to advance hydrogenation at 80° C.

FIG. 1 shows IR spectra of the SBS copolymer before and after hydrogenation. It can be seen that in the spectrum of the SBS tri-block copolymer before hydrogenation, the trans double bond is present at wavelength peaks 968 cm$^{-1}$ and 995 cm$^{-1}$ and the 1,2-vinyl group double bond is present at wavelength peak 912 cm$^{-1}$. After 1 hour of hydrogenation, it can be seen that the peaks disappear obviously, the hydrogenation conversion (the hydrogenation conversion of the unsaturated double bond of the 1,3-butadiene unit) was measured at 98%. Hydrogenation data is summarized in Table 1.

EXAMPLE 3

1000 g of the polymer solution of SBS tri-block copolymer prepared from Example 1 was transferred to a pressure-resistant hydrogenation vessel and maintained in nitrogen atmosphere. 0.11 mmol of silicon(IV) isopropoxide was dissolved in 10 ml of cyclohexane at room temperature, 0.055 mmol of bis(cyclopentadienyl)titanium dichloride was dissolved in 10 ml of cyclohexane, and 0.33 mmol of triisobutyl aluminum was dissolved in 10 ml of cyclohexane. The above solutions were added to the SBS copolymer. Hydrogen was fed under a pressure of 25 kg/cm$^2$ to advance hydrogenation at 8020 C. The 1,3-butadiene hydrogenation conversion was measured to reach 76% after 30 minutes and reach 96% after 1 hour. The hydrogenation data is summarized in Table 1.

EXAMPLE 4

1000 g of the polymer solution of SBS tri-block copolymer prepared from Example 1 was transferred to a pressure-resistant hydrogenation vessel and maintained in nitrogen atmosphere. 0.11 mmol of silicon(IV) isopropoxide was dissolved in 10 ml of cyclohexane at room temperature, 0.055 mmol of bis(cyclopentadienyl)titanium dichloride was dispersed in 10 ml of cyclohexane, and 0.33 mmol of triisobutyl aluminum was dissolved in 10 ml of cyclohexane. The above solutions were added to the SBS copolymer. Hydrogen was fed under a pressure of 25 kg/cm$^2$ to advance hydrogenation at 80° C. The 1,3-butadiene hydrogenation conversion was measured to reach 85% after 30 minutes and reach 98% after 1 hour. The hydrogenation data is summarized in Table 1.

EXAMPLE 5

The same procedures described in Example 3 were repeated except that silicon(IV) isopropoxide was changed to 0.165 mmol of silicon(IV) isobutoxide dissolved in 10 ml of cyclohexane. 0.055 mmol of bis(cyclopentadienyl)titanium dichloride was dispersed in 10 ml of cyclohexane, and 0.33 mmol of triisobutyl aluminum was dissolved in 10 ml of cyclohexane. The above solutions were added to the SBS copolymer. Hydrogen was fed under a pressure of 25 kg/cm$^2$ to advance hydrogenation at 80° C. The 1,3-butadiene hydrogenation conversion was measured to reach 90% after 30 minutes and reach 98% after 1 hour. The hydrogenation data is summarized in Table 1.

EXAMPLE 6

The same procedures described in Example 3 were repeated except that silicon(IV) isppropoxide was changed to 0.2 mmol of silicon(IV) n-dodecoxide dissolved in 10 ml of cyclohexane. 0.055 mmol of bis(cyclopentadienyl)titanium dichloride was dispersed in 10 ml of cyclohexane, and 0.33 mmol of triisobutyl aluminum was dissolved in 10 ml of cyclohexane. The above solutions were added to the SBS copolymer. Hydrogen was fed under a pressure of 25 kg/cm$^2$ to advance hydrogenation at 80° C. The 1,3-butadiene hydrogenation conversion was measured to reach 65% after 30 minutes and reach 97% after 1.5 hours. The hydrogenation data is summarized in Table 1.

EXAMPLE 7

The same procedures described in Example 3 were repeated except that silicon(IV) isopropoxide was changed to 0.2 mmol of chlorosilicon tri-n-propoxide dissolved in 10 ml of cyclohexane. 0.055 mmol of bis(cyclopentadienyl) titanium dichloride was dispersed in 10 ml of cyclohexane, and 0.33 mmol of triisobutyl aluminum was dissolved in 10 ml of cyclohexane. The above solutions were added to the SBS copolymer. Hydrogen was fed under a pressure of 25 kg/cm$^2$ to advance hydrogenation at 80° C. The 1,3-butadiene hydrogenation conversion was measured to reach 65% after 30 minutes, 86% after 1 hour, and 97% after 1.5 hours. The hydrogenation data is summarized in Table 1.

EXAMPLE 8

The same procedures described in Example 3 were repeated except that silicon(IV) isopropoxide was changed to 0.275 mmol of di(n-propoxide)bis(2,2,6,6-tetramethyl-3, 5-heptane-dionato)silane dissolved in 10 ml of cyclohexane. 0.055 mmol of bis(cyclopentadienyl)titanium dichloride was dispersed in 10 ml of cyclohexane, and 0.33 mmol of triisobutyl aluminum was dissolved in 10 ml of cyclohexane. The above solutions were added to the SBS copolymer. Hydrogen was fed under a pressure of 25 kg/cm$^2$ to advance hydrogenation at 80° C. The 1,3-butadiene hydrogenation conversion was measured to reach 65% after 30 minutes, 76% after 1 hour, and 95% after 2 hours. The hydrogenation data is summarized in Table 1.

EXAMPLE 9

The same procedures described in Example 3 were repeated except that silicon(IV) isopropoxide was changed to 0.25 mmol of tin(IV) isobutoxide dissolved in 10 ml of cyclohexane. 0.055 mmol of bis(cyclopentadienyl)titanium dichloride was dispersed in 10 ml of cyclohexane, and 0.33 mmol of triisobutyl aluminum was dissolved in 10 ml of cyclohexane. The above solutions were added to the SBS copolymer. Hydrogen was fed under a pressure of 25 kg/cm$^2$ to advance hydrogenation at 80° C. The 1,3-butadiene hydrogenation conversion was measured to reach 65% after 30 minutes, 86% after 1 hour, and 95% after 1.5 hours. The hydrogenation data is summarized in Table 1.

EXAMPLE 10

The same procedures described in Example 3 were repeated except that silicon(IV) isopropoxide was changed to 0.25 mmol of aluminum(III) isobutoxide dissolved in 10 ml of cyclohexane. 0.055 mmol of bis(cyclopentadienyl) titanium dichloride was dispersed in 10 ml of cyclohexane, and 0.33 mmol of triisobutyl aluminum was dissolved in 10 ml of cyclohexane. The above solutions were added to the SBS copolymer. Hydrogen was fed under a pressure of 25 kg/cm$^2$ to advance hydrogenation at 80° C. The 1,3-butadiene hydrogenation conversion was measured to reach 65% after 30 minutes, 86% after 1 hour, and 95% after 1.5 hours. The hydrogenation data is summarized in Table 1.

EXAMPLE 11

The same procedures described in Example 3 were repeated except that silicon(IV) isopropoxide was changed to 0.25 mmol of gallium(III) ethoxide dissolved in 10 ml of cyclohexane. 0.055 mmol of bis(cyclopentadienyl)titanium dichloride was dispersed in 10 ml of cyclohexane, and 0.33 mmol of triisobutyl aluminum was dissolved in 10 ml of cyclohexane. The above solutions were added to the SBS copolymer. Hydrogen was fed under a pressure of 25 kg/cm² to advance hydrogenation at 80° C. The 1,3-butadiene hydrogenation conversion was measured to reach 65% after 30 minutes, 86% after 1 hour, and 95% after 1.5 hours. The hydrogenation data are summarized in Table 1.

The following comparative examples are intended to demonstrate the invention more fully. It is noted that the catalyst compositions of comparative examples do not include the hydrogenation catalyst (b) disclosed in embodiments of the invention.

COMPARATIVE EXAMPLE 1

The same procedures described in Example 3 were repeated except that silicon(IV) isopropoxide was not added. 0.055 mmol of bis(cyclopentadienyl)titanium dichloride was dispersed in 10 ml of cyclohexane, and 0.33 mmol of triisobutyl aluminum was dissolved in 10 ml of cyclohexane. The above solutions were added to the SBS copolymer. Hydrogen was fed under a pressure of 25 kg/cm² to advance hydrogenation at 80° C.

Figure 2:
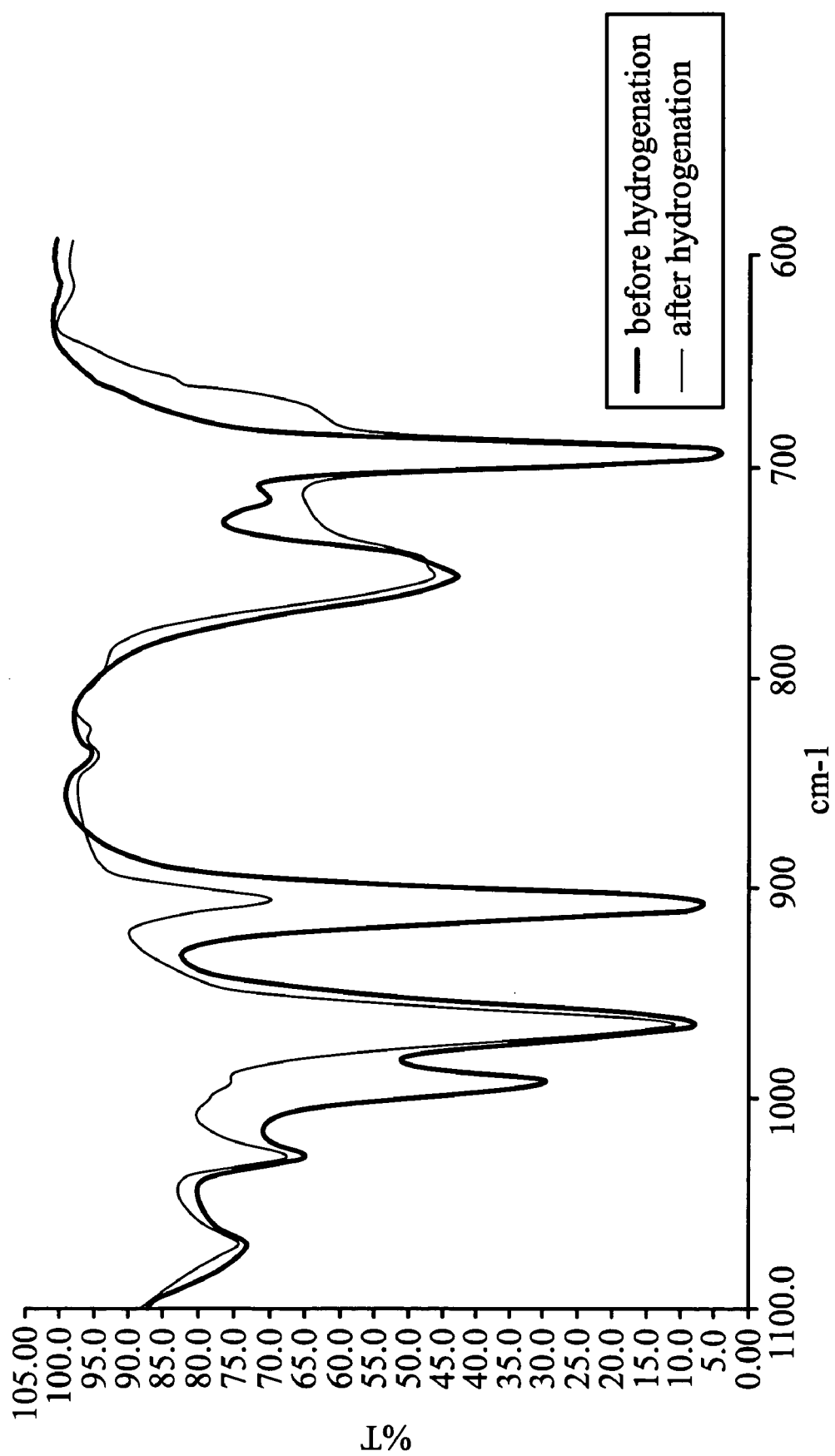
FIG. 2 shows IR spectrum of the SBS copolymer of Comparative Example 1 before and after hydrogenation.

FIG. 2 shows IR spectra of the SBS copolymer before and after hydrogenation. It can be seen that in the spectrum of the SBS tri-block copolymer before hydrogenation, the trans double bond is present at the wavelength peaks 968 cm$^{-1}$ and 995 cm$^{-1}$ and the 1,2-vinyl group double bond is present at the wavelength peak 912 cm$^{-1}$. After 1 hour of hydrogenation, it can be seen that the 995 cm$^{-1}$ and 912 cm$^{-1}$ peaks have decreased absorption, but the absorption of 968 cm$^{-1}$ peak has almost no change. At that time, the 1,3-butadiene hydrogenation conversion was measured to 23%. The hydrogenation data are summarized in Table 1.

COMPARATIVE EXAMPLE 2

1000 g of the polymer solution of SBS tri-block copolymer prepared from Example 1 was transferred to a pressure-resistant hydrogenation vessel. The SBS copolymer was fed with hydrogen and stirred for 30 minutes. The procedures described in Example 3 were repeated except that silicon (IV) isopropoxide was changed to 0.22 mmol of n-butyl lithium. 0.055 mmol of bis(cyclopentadienyl)titanium dichloride was dispersed in 10 ml of cyclohexane, and 0.44 mmol of triisobutyl aluminum was dissolved in 10 ml of cyclohexane. The above solutions were added to the SBS copolymer. Hydrogen was fed under a pressure of 25 kg/cm2 to advance hydrogenation at 80° C. The 1,3-butadiene hydrogenation conversion was measured to reach 15% after 30 minutes and reach 24% after 1 hour. The hydrogenation data are summarized in Table 1.

TABLE 1

| Example | Residual trans double bonds (%) | Residual 1,2-vinyl bond (%) | 1,3-butadiene hydrogenation conversion (%) | benzene hydrogenation conversion (%) |
| --- | --- | --- | --- | --- |
| Example2 | 2.7 | 0.3 | 98 | <1 |
| Example3 | 2.6 | 0.4 | 96 | <1 |
| Example4 | 1.5 | 0.5 | 98 | <1 |
| Example5 | 1.7 | 0.3 | 98 | <1 |

TABLE 1-continued

| Example | Residual trans double bonds (%) | Residual 1,2-vinyl bond (%) | 1,3-butadiene hydrogenation conversion (%) | benzene hydrogenation conversion (%) |
| --- | --- | --- | --- | --- |
| Example6 | 2.7 | 0.3 | 97 | <1 |
| Example7 | 2.6 | 0.4 | 97 | <1 |
| Example8 | 1.5 | 0.2 | 97 | <1 |
| Example9 | 1.7 | 0.3 | 97 | <1 |
| Example10 | 4.2 | 0.8 | 95 | <1 |
| Example11 | 4.2 | 0.8 | 95 | <1 |
| Comparative Example1 | 75.5 | 1.5 | 23 | <1 |
| Comparative Example2 | 74.4 | 1.6 | 24 | <1 |

The hydrogenated conjugated diene polymers in Examples 1~11 have residual trans double bonds less than 5%, residual 1,2-vinyl bonds less than 5%, and 1,3-butadiene hydrogenation conversion more than 95%. In comparison with Examples 1~9, residual trans double bonds and residual 1,2-vinyl bond in Comparative Example 1 and 2 are obviously higher, and 1,3-butadiene hydrogenation conversion is less than 25%.

EXAMPLES 12~17

The procedures described in Example 3 were repeated except that hydrogenation temperatures, hydrogenation pressures, and reaction times were varied in accordance with the conditions of Table 2.

TABLE 2

| Example | Hydrogenation temperature (° C.) | Hydrogenation pressure (Kg/cm²) | reaction time (hr) | 1,3-butadiene hydrogenation conversion (%) |
| --- | --- | --- | --- | --- |
| Example 12 | 60 | 10 | 1 | 65 |
| Example 13 | 60 | 10 | 3 | 94 |
| Example 14 | 80 | 10 | 1 | 97 |
| Example 15 | 80 | 25 | 0.5 | 97 |
| Example 16 | 100 | 10 | 0.5 | 97 |
| Example 17 | 100 | 25 | 0.5 | 97 |

Since the catalyst concentration is very low, there is no need to remove the catalyst from the hydrogenated polymer, which greatly enhances economical efficiency. Moreover, the hydrogenation of the present invention is very rapid and exhibits good reproducibility over a wide range of temperatures and pressures.

Furthermore, the catalyst composition comprises a catalyst having ability to hydrogenate the conjugated diene polymer. In addition, the catalyst can combine with other catalysts to increase the overall hydrogenation efficiency and stabilize the activity of other catalysts. Therefore, when the catalyst composition of the present invention is added to the conjugated diene polymer, it can be stored for a long period of time and maintains good catalytic activity stability and reproducibility.

While the invention has been described by way of example and in terms of preferred embodiment, it is to be understood that the invention is not limited thereto. It is therefore intended that the following claims be interpreted as covering all such alteration and modifications as fall within the true spirit and scope of the invention.

What is claimed is:

1. A process for hydrogenation of a conjugated diene polymer; the conjugated diene polymer being a homopolymer or copolymer of a conjugated diene, the process comprising bringing the conjugated diene polymer in an inert organic solvent into contact with hydrogen in the presence of a hydrogenation catalyst composition to selectively hydrogenate the unsaturated double bonds of the conjugated diene polymer, wherein the hydrogenation catalyst composition includes the following hydrogenation catalyst:

(a) a titanium compound represented by formula (I), of:

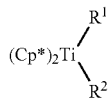

wherein $R^1$ and $R^2$ are the same or different and are hydrogen, halogen, $C_1$–$C_8$ alkyl or alkoxy, $C_6$–$C_{12}$ cycloalkyl, phenyl, phenoxy, $C_7$–$C_{10}$ arylalkoxy and arylalkyl, carboxy, —$CH_2P(phenyl)_2CH_2Si(C_1$–$C_5$ alkyl)$_3$ or —$P(phenyl)_2$, Cp* indicates cyclopendienyl, indenyl, fluorenyl, or derivatives thereof;

(b) a compound represented by formula (II), of:

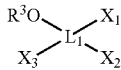

or formula (III), of:

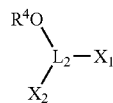

wherein $L_1$ is a Group IVA element, $L_2$ is a Group IIIA element $R^3$ is $C_1$–$C_{12}$ alkyl or $C_3$–$C_{12}$ cycloalkyl, $R^4$ is $C_2$–$C_{12}$ alkyl or $C_3$–$C_{12}$ cycloalkyl, $X_1$, $X_2$, and $X_3$ are the same or different and are $C_1$–$C_{12}$ alkyl, $C_1$–$C_{12}$ alkoxy, $C_1$–$C_{12}$ cycloalkoxy, phenyl, or phenoxy; and (c) a trialkylaluminum compound represented by formula (IV), of:

wherein $R^5$, $R^6$, and $R^7$ are the same or different and are $C_1$–$C_{12}$ alkyl or $C_6$–$C_{12}$ aryl, provided that $R^5$, $R^6$, and $R^7$ are not methyl simultaneously, wherein the molar ratio of the hydrogenation catalyst (b) to the hydrogenation catalyst (a) is 0.1 to 50, the molar ratio of the hydrogenation catalyst (c) to the hydrogenation catalyst (a) is 0.1 to 50, and the hydrogenation catalyst (a) is present in an amount of 0.0001 to 50 mmol based on 100 g of the conjugated diene polymer.

2. The process as claimed in claim 1, wherein the hydrogenation catalyst (a) is bis(cyclopentadienyl)titanium dichloride, bis(1-fluorenyl)titanium dichloride, bis(1-indenyl)titanium dichloride, bis(1-fluorenyl)titanium dibromide, bis(1-indenyl)titanium dibromide, bis(cyclopentadienyl)titanium dimethyl, bis(cyclopentadienyl)titanium diethyl, bis(cyclopentadienyl)titanium dimethanol, bis(indenyl)titanium dimethanol, bis(fluorenyl)titanium dimethanol, bis(cyclopentadienyl)titanium diethoxy, bis(cyclopentadienyl)titanium dibutoxy, bis(cyclopentadienyl)titanium diphenoxy, bis(cyclopentadienyl)titanium dibenzoxy, bis(cyclopentadienyl)titanium dicarboxy, or derivatives thereof.

3. The process as claimed in claim 1, wherein the hydrogenation catalyst (b) is represented by formula (II), and at least one of $X_1$, $X_2$, and $X_3$ is $C_1$–$C_{12}$ alkoxy or $C_1$–$C_{12}$ cycloalkoxy.

4. The process as claimed in claim 1, wherein the hydrogenation catalyst (b) is represented by formula (II), and $X_1$ and $X_2$ are the same or different and are $C_1$–$C_{12}$ alkoxy or $C_1$–$C_{12}$ cycloalkoxy, and $X_3$ is phenyl or alkyl.

5. The process as claimed in claim 4, wherein the hydrogenation catalyst (b) is tri-ethoxy methyl silane, tri-n-propoxy methyl silane, tri-iso-propoxy methyl silane, tri-n-butoxy methyl silane, tri-tert-butoxy methyl silane, tri-n-pentyloxy ethyl silane, tri-tert-pentyloxy ethyl silane, tri-n-propoxy phenyl silane, tri-iso-propoxy phenyl silane, tri-n-butoxy phenyl silane, tri-tert-butoxy phenyl silane, tri-n-pentyloxy phenyl silane, tri-tert-pentyloxy phenyl silane, tri-ethoxy methyl tin, tri-n-propoxy methyl tin, tri-iso-propoxy methyl tin, tri-n-butoxy methyl tin, or tri-tert-butoxy methyl tin.

6. The process as claimed in claim 1, wherein the hydrogenation catalyst (b) is represented by formula (II), and one of $X_1$, $X_2$, and $X_3$ is $C_1$–$C_{12}$ alkoxy or $C_1$–$C_{12}$ cycloalkoxy and the other two are phenyl.

7. The process as claimed in claim 6, wherein the hydrogenation catalyst (b) is di-n-propoxy dipheny silane, di-n-butoxy diphenyl silane, di-tert-pentyloxy diphenyl silane, di-n-propoxy dipheny tin.

8. The process as claimed in claim 1, wherein the hydrogenation catalyst (b) is represented by formula (II), and $X_1$, $X_2$, and $X_3$ are the same or different and are $C_1$–$C_{12}$ alkoxy or $C_1$–$C_{12}$ cycloalkoxy.

9. The process as claimed in claim 8, wherein the hydrogenation catalyst (II) is silicon(IV) $C_1$–$C_{12}$ alkoxide or tin(IV) $C_1$–$C_{12}$ alkoxide.

10. The process as claimed in claim 9, wherein the hydrogenation catalyst (b) is silicon(IV) ethoxide, silicon (IV) n-propoxide, silicon(IV) iso-propoxide, silicon(IV) n-butoxide, silicon(IV) sec-butoxide, silicon(IV) tert-butoxide, silicon(IV) n-pentoxide, silicon(IV) tert-pentoxide, silicon(IV) 1-methyl-butoxide, silicon(IV) 2-methyl-butoxide, silicon(IV) 1,2-dimethyl-propoxide, silicon(IV) n-hexoxide, silicon(IV) tert-hexoxide, silicon(IV) 1,1-dimethyl-butoxide, silicon(IV) 2,2-dimethyl-butoxide, silicon(IV) 3,3-dimethyl-butoxide, silicon(IV) hendecoxide, silicon(IV) dodecoxide, tin(IV) ethoxide, tin(IV) n-propoxide, tin(IV) sec-propoxide, tin(IV) n-butoxide, tin(IV) sec-buyoxide, tin(IV) tert-butoxide, or tin(IV) n-pentyloxide.

11. The process as claimed in claim 1, wherein the hydrogenation catalyst (b) is represented by formula (III), and at least one of $X_1$ and $X_2$ is $C_1$–$C_{12}$ alkoxy or $C_1$–$C_2$ cycloalkoxy.

12. The process as claimed in claim 1, wherein the hydrogenation catalyst (b) is represented by formula (III), and $X_1$ and $X_2$ are the same or different and are $C_1$–$C_{12}$ alkoxy or $C_1$–$C_{12}$ cycloalkoxy.

13. The process as claimed in claim 12, wherein the hydrogenation catalyst (b) is aluminum(III) $C_1$–$C_{12}$ alkoxy or gallium $C_1$–$C_{12}$ alkoxy.

14. The process as claimed in claim 13, wherein the molar ratio of the hydrogenation catalyst (b) is aluminum(III) ethoxide, aluminum(III) n-propoxide, aluminum(III) tert-propoxide, aluminum(III) n-butoxide, aluminum(III) sec-butoxide, aluminum(III) tert-butoxide, gallium(III) ethoxide, gallium(III) n-propoxide, gallium(III) tert-propoxide, gallium(III) n-butoxide, gallium(III) sec-butoxide, or gallium(III) tert-butoxide.

15. The process as claimed in claim 1, wherein the hydrogenation catalyst (c) is triethyl aluminum, tri-n-propyl aluminum, triisopropyl aluminum, tributyl aluminum, tri-sec-butyl aluminum, triisobutyl aluminum, tri-n-pentyl aluminum, triisopentyl aluminum, tri-n-hexyl aluminum, tri-isohexyl aluminum, tri(1-methylpentyl)aluminum, tri(2,5-dimethyloctyl)aluminum, tri(2,6-dimethyloctyl)aluminum, or triphenyl aluminum. Preferred selections include triethyl aluminum, triisopropyl aluminuim, tributyl aluminuim, or triisobutyl aluminum.

16. The process as claimed in claim 1, wherein the hydrogenation catalyst (c) is triisobutyl aluminum.

17. The process as claimed in claim 1, wherein the hydrogenation catalyst (I) is present in an amount of 0.005 to 0.2 mmol based on 100 g of the conjugated diene polymer.

18. The process as claimed in claim 1, wherein the molar ratio of the hydrogenation catalyst (II) to the hydrogenation catalyst (I) is between 2 and 15.

19. The process as claimed in claim 1, wherein the hydrogenation catalyst (III) to the hydrogenation catalyst (I) is between 2 and 15.

20. The process as claimed in claim 1, wherein the conjugated diene polymer has a number average molecular weight of 1000 to 1000000.

21. The process as claimed in claim 1, wherein the conjugated diene polymer is a conjugated diene/vinyl aromatic hydrocarbon copolymer.

22. The process as claimed in claim 1, wherein the hydrogenation is conducted at a temperature of 40° C. to 140° C. and at a hydrogen pressure of 1 to 50 kg/cm$^2$.

23. The process as claimed in claim 17, wherein at least 50% of the unsaturated double bonds in the conjugated diene units are hydrogenated.

24. The process as claimed in claim 19, wherein at least 90% of the unsaturated double bonds in the conjugated diene units are hydrogenated.

25. The process as claimed in claim 17, wherein lower than 10% of the aromatic ring double bonds in the vinyl aromatic hydrocarbon units are hydrogenated.

26. The process as claimed in claim 21, wherein lower than 3% of the aromatic ring double bonds in the vinyl aromatic hydrocarbon units are hydrogenated.

27. A hydrogenation catalyst composition comprising the following hydrogenation catalysts:

(a) a titanium compound represented by formula (I), of:

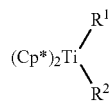

wherein
R$^1$ and R$^2$ are the same or different and are hydrogen, halogen, C$_1$–C$_8$ alkyl or alkoxy, C$_6$–C$_{12}$ cycloalkyl, phenyl, phenoxy, C$_7$–C$_{10}$ arylalkoxy and arylalkyl, carboxy, —CH$_2$P(phenyl)$_2$, —CH$_2$Si(C$_1$–C$_5$ alkyl)$_3$ or —P(phenyl)$_2$, Cp* indicates cyclopendienyl, indenyl, fluorenyl, or derivatives thereof;

(b) a compound represented by formula (II), of:

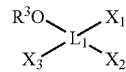

or formula (III), of:

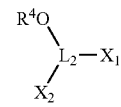

wherein
L$_1$ is a Group IVA element,
L$_2$ is a Group IIIA element
R$^3$ is C$_1$–C$_{12}$ alkyl or C$_3$–C$_{12}$ cycloalkyl,
R$^4$ is C$_2$–C$_{12}$ alkyl or C$_3$–C$_{12}$ cycloalkyl,
X$_1$, X$_2$, and X$_3$ are the same or different and are C$_1$–C$_{12}$ alkyl, C$_1$–C$_{12}$alkoxy, C$_1$–C$_{12}$cycloalkoxy, phenyl, or phenoxy; and (c) a trialkylaluminum compound represented by formula (IV), of:

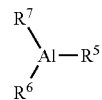

wherein
R$^5$, R$^6$, and R$^7$ can be the same or different and are C$_1$–C$_{12}$ alkyl or C$_6$–C$_{12}$ aryl, provided that R$^5$, R$^6$, and R$^7$ are not methyl simultaneously, wherein the molar ratio of the hydrogenation catalyst (b) to the hydrogenation catalyst (a) is 0.1 to 50, the molar ratio of the hydrogenation catalyst (c) to the hydrogenation catalyst (a) is 0.1 to 50, and the hydrogenation catalyst (a) is present in an amount of 0.0001 to 50 mmol based on 100 g of the conjugated diene polymer.

28. The hydrogenation catalyst composition as claimed in claim 27, further comprising a conjugated diene polymer, wherein the hydrogenation catalyst (a) is present in an amount of 0.0001 to 50 mmol based on 100 g of the conjugated diene polymer.

* * * * *